(12) United States Patent
Chang et al.

(10) Patent No.: US 10,345,147 B2
(45) Date of Patent: Jul. 9, 2019

(54) OPTICAL PACKAGE

(71) Applicant: INDUSTRIAL TECHNOLOGY RESEARCH INSTITUTE, Chutung, Hsinchu (TW)

(72) Inventors: Chia-Jung Chang, Zhubei (TW); Yu-Sheng Hsieh, Zhubei (TW); Jing-Yuan Lin, New Taipei (TW); Chih-Hao Hsu, Taipei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 286 days.

(21) Appl. No.: 15/391,413

(22) Filed: Dec. 27, 2016

(65) Prior Publication Data

US 2018/0087962 A1    Mar. 29, 2018

(30) Foreign Application Priority Data

Sep. 26, 2016 (TW) .............................. 105131056 A

(51) Int. Cl.
*G01J 3/12* (2006.01)
*G01J 3/02* (2006.01)
(Continued)

(52) U.S. Cl.
CPC . *G01J 3/12* (2013.01); *G01J 1/06* (2013.01); *G01J 3/0216* (2013.01);
(Continued)

(58) Field of Classification Search
CPC ................. G01J 3/12; G01J 2003/1204; G01J 2003/1208; G01J 2003/1213;
(Continued)

(56) References Cited

U.S. PATENT DOCUMENTS

| 5,446,290 A | 8/1995 | Fujieda et al. |
| 5,550,373 A | 8/1996 | Cole et al. |

(Continued)

FOREIGN PATENT DOCUMENTS

| CN | 104699293 A | 6/2015 |
| EP | 2884548 A2 | 6/2015 |

(Continued)

OTHER PUBLICATIONS

O.O. Ogunsola et al.; "Chip-Level Waveguide-Mirror-Pillar Optical Interconnect Structure"; IEEE Photonics Techology Letters; Aug. 1, 2006; pp. 1672-1674; vol. 18, No. 15; IEEE.

(Continued)

*Primary Examiner* — John R Lee
(74) *Attorney, Agent, or Firm* — Muncy, Geissler, Olds & Lowe, P.C.

(57) ABSTRACT

An optical package is provided. The optical package includes an interference splitter allowing a light having a predetermined wavelength range to transmit through, a sensing element, and a light-transmitting structure. The light-transmitting structure includes a light-transmitting pillar and a light-absorbing layer surrounding the light-transmitting pillar, and the light-absorbing layer absorbs the light having the predetermined wavelength range. The interference splitter, the light-transmitting pillar, and the sensing element are arranged aligned with each other along an extending direction of the light-transmitting pillar. The sensing element is configured to receive the light transmitting through the interference splitter and the light-transmitting pillar.

14 Claims, 9 Drawing Sheets

(51) Int. Cl.
    *G01J 1/06* (2006.01)
    *G01J 3/26* (2006.01)
    *G01J 3/28* (2006.01)

(52) U.S. Cl.
    CPC ........... *G01J 3/0229* (2013.01); *G01J 3/0256* (2013.01); *G01J 3/0262* (2013.01); *G01J 3/26* (2013.01); *G01J 3/2803* (2013.01); *G01J 2003/1226* (2013.01)

(58) Field of Classification Search
    CPC ....... G01J 2003/1226; G01J 2003/1239; G01J 3/26; G01J 3/28; G01J 3/2803; G01J 2003/2806; G01J 3/02; G01J 3/0205; G01J 3/0216; G01J 3/0227; G01J 3/0229; G01J 3/0237; G01J 3/0256; G01J 3/0262; G01J 1/06; G01J 1/04; G01J 1/0407
    See application file for complete search history.

(56) References Cited

U.S. PATENT DOCUMENTS

| | | | |
|---|---|---|---|
| 6,712,480 | B1 | 3/2004 | Leung et al. |
| 6,796,866 | B2 | 9/2004 | George et al. |
| 7,110,158 | B2 | 9/2006 | Miles |
| 7,376,169 | B2 | 5/2008 | Henrichs |
| 7,420,738 | B2 | 9/2008 | Verghese |
| 7,864,313 | B2 | 1/2011 | Baumberg et al. |
| 8,031,335 | B2 | 10/2011 | Wang et al. |
| 8,129,676 | B2 | 3/2012 | Vestel et al. |
| 8,243,360 | B2 | 8/2012 | Kothari |
| 8,599,301 | B2 | 12/2013 | Dowski, Jr. et al. |
| 8,654,347 | B2 | 2/2014 | Antila et al. |
| 8,717,572 | B2 | 5/2014 | Faase et al. |
| 8,735,225 | B2 | 5/2014 | Palmateer et al. |
| 8,976,357 | B2 | 3/2015 | Uematsu et al. |
| 2002/0043633 | A1* | 4/2002 | Jackson .................. G01V 8/20 250/559.36 |
| 2004/0217264 | A1 | 11/2004 | Wood et al. |
| 2007/0030483 | A1 | 2/2007 | Everett et al. |
| 2008/0309921 | A1* | 12/2008 | Faase ........................ G01J 3/02 356/73 |
| 2011/0046018 | A1 | 2/2011 | Chen et al. |
| 2012/0327248 | A1 | 12/2012 | Tack et al. |
| 2014/0246610 | A1 | 9/2014 | Harpin et al. |
| 2015/0155400 | A1 | 6/2015 | Xue et al. |
| 2018/0087962 | A1* | 3/2018 | Chang et al. ............. G01J 3/12 |

FOREIGN PATENT DOCUMENTS

| | | |
|---|---|---|
| JP | 2012-173208 A | 9/2012 |
| TW | I379478 | 12/2012 |
| TW | I434029 | 4/2014 |
| TW | I443314 | 7/2014 |
| TW | 201443406 A | 11/2014 |
| TW | I470194 B | 1/2015 |
| TW | 201534875 A | 9/2015 |
| TW | I521238 | 2/2016 |
| TW | I581004 | 5/2017 |
| WO | WO 2000-007411 A1 | 2/2000 |

OTHER PUBLICATIONS

J. H. Jerman et al.; "Miniature Fabry-Perot Interferometers Micromachined in Silcon for use in Optical Fiber WDM Systems"; 1991; pp. 372-375; IEEE.

Muhannad S. Bakir et al.; "Sea of Polymer Pillars Electrical and Optical Chip I/O Interconnections for Gigascale Integration"; IEEE Transactions on Electron Devices; Jul. 7, 2004; pp. 1069-1077; vol. 51, No. 7; IEEE.

Zetao MA et al.; "Channel drop filters using photonic crystal Fabry-Perot resonators"; Optics Communications 284; 2011; pp. 1192-1196; Elsevier.

Yasuhiro Kobayashi et al.; "Improvement of Coupling Efficiency for Passive Alighment of Stacked Multifiber Tapes to a Vertical-Cavity Surface-Emitting Laser Array"; Jp. J. Appl. Phys.; Mar. 1997; pp. 1872-1875; Part 1. No. 3 B.

* cited by examiner

OPTICAL PACKAGE

This application claims the benefit of Taiwan application Serial No. 105131056, filed Sep. 26, 2016, the subject matter of which is incorporated herein by reference.

TECHNICAL FIELD

The present disclosure relates to an optical package having an interference splitter therein.

BACKGROUND

Among consumer electronic products, the main smart carriers are currently smart phones, and the sensing devices in the existing smart phones mostly perform physical quantity measurements, such as detecting accelerations and angular velocities by inertial sensors and detecting heights by pressure meters. However, for unknown physical quantity measurements, adopting fingerprints spectrum is required, wherein optical detection is widely used in smart phones.

However, in current commercial-available consumer electronic products, optical detectors are merely used as distance detectors, fingerprint recognition systems and camera photography modules, and consumer electronic products with spectrum analysis abilities have not been developed. Therefore, the developments and popularization of spectrum detection technology in consumer electronic products have been the research and development topics that the industry has been working on.

SUMMARY

According to an embodiment of the present disclosure, an optical package is provided. The optical package includes an interference splitter allowing a light having a predetermined wavelength range to transmit through, a sensing element and a light-transmitting structure. The light-transmitting structure includes a light-transmitting pillar and a light-absorbing layer. The light-absorbing layer surrounds the light-transmitting pillar and absorbs the light having the predetermined wavelength range. The interference splitter, the light-transmitting pillar, and the sensing element are arranged aligned with each other along an extending direction of the light-transmitting pillar, and the sensing element is configured to receive the light transmitting through the interference splitter and the light-transmitting pillar.

The following description is made with reference to the accompanying drawings and embodiments.

DETAILED DESCRIPTION OF DISCLOSED EMBODIMENTS

In the embodiments of the present disclosure, by the design of the light-transmitting pillar and the light-absorbing layer of the light-transmitting structure, the light transmitting through the light-transmitting pillar without or less being absorbed by the light-absorbing layer is allowed to have a relatively small divergent angle, such that the spatial resolution and the spectral resolution of the optical package can be increased. Details of embodiments of the present disclosure are described hereinafter with accompanying drawings. Structures disclosed in the embodiments are for examples and for explaining the disclosure only and are not to be construed as limitations. A person having ordinary skill in the art may modify or change corresponding structures and compositions of the embodiments according to actual applications.

Figure 1:
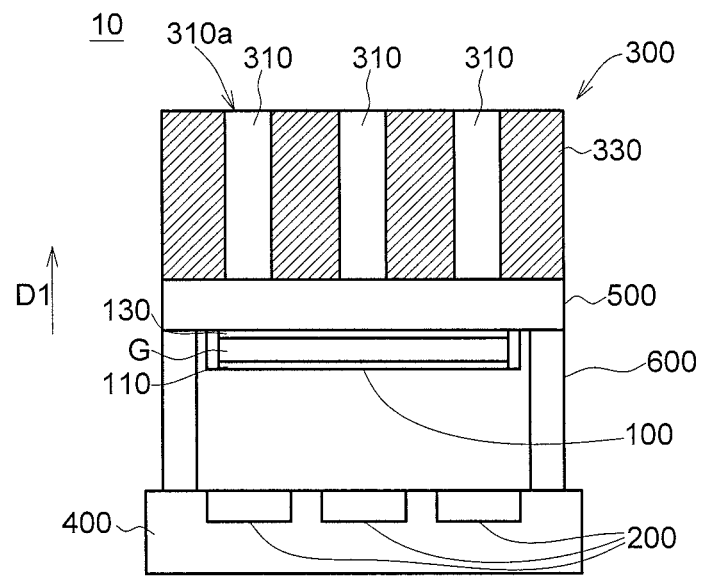
FIG. 1 shows a schematic drawing of an optical package according to an embodiment.
Figure 2A:
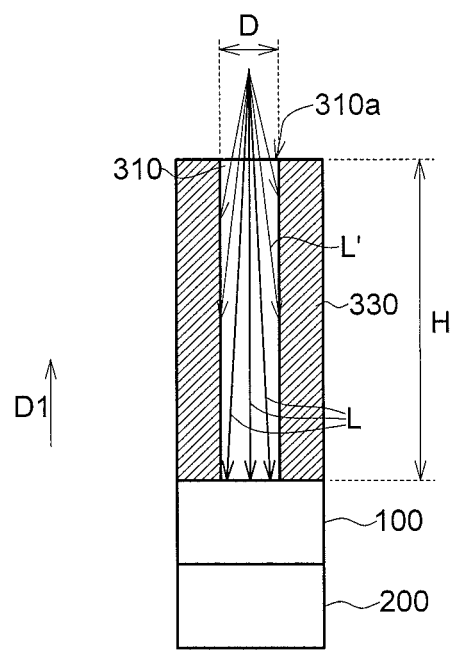
FIG. 2A shows a partial schematic drawing of an optical package according to an embodiment.

FIG. 1 shows a schematic drawing of an optical package according to an embodiment, and FIG. 2A shows a partial schematic drawing of an optical package according to an embodiment. As shown in FIGS. 1-2A, the optical package 10 includes an interference splitter 100 allowing a light having a predetermined wavelength range to transmit through, a sensing element 200 and a light-transmitting structure 300. The light-transmitting structure 300 includes a light-transmitting pillar 310 and a light-absorbing layer 330. The light-absorbing layer 330 surrounds the light-transmitting pillar 310. The light-absorbing layer 330 absorbs the light having the predetermined wavelength range. As shown in FIGS. 1-2A, the interference splitter 100 and the light-transmitting pillar 310 are arranged aligned with each other along an extending direction D1 of the light-transmitting pillar 310, and the sensing element 200 is configured to receive the light L transmitting through the interference splitter 100 and the light-transmitting pillar 310. The wavelength range of the light L includes the aforementioned predetermined wavelength range.

In the embodiment, the light-transmitting pillar 310 may have a light transmittance rate of 70% or higher with respect to the aforementioned light having the predetermined wavelength range, and the light-absorbing layer 330 may have a light absorption rate of 70% or higher with respect to the aforementioned light having the predetermined wavelength range. In some embodiments, the light-absorbing layer 330 may have a light absorption rate of 90% or higher with respect to a light having a wavelength being allocated within the predetermined wavelength range.

In other words, according to the embodiments of the present disclosure, the light-transmitting pillar 310 and the light-absorbing layer 330 of the light-transmitting structure 300 are light-transmitted and light-absorb respectively to the light having the predetermined wavelength range. Therefore, the light having the predetermined wavelength range transmits through the light-transmitting pillar 310 and is absorbed by the light-absorbing layer 330. By the design of the light-transmitting pillar 310 and the light-absorbing layer 330 of the light-transmitting structure 300, the light transmitting through the light-transmitting pillar 310 without or less being absorbed by the light-absorbing layer 330 is allowed to have a relatively small divergent angle, such that the spatial resolution and the spectral resolution of the optical package 10 can be increased.

Specifically speaking, as shown in FIG. 2A, the lights L and L' having the predetermined wavelength range both enter the light-transmitting pillar 31, while in propagation, the light L' having a larger divergent angle contacts the light-absorbing layer 330 and is absorbed by the light-absorbing layer 330, and the light L having a smaller divergent angle can reach the interference splitter 100 and the sensing element 200 without contacting the light-absorbing layer 330; as such, the spatial resolution and the spectral resolution of the optical package 10 can be increased. The above-mentioned divergent angle is the angle formed between the incident light and the normal line of the light incident surface.

As shown in FIG. 2A, the light-transmitting pillar 310 has a width D and a height H. In some embodiments, a ratio of the height H to the width D may be larger than or equal to 5. That is, the aspect ratio of the light-transmitting pillar 310 may be larger than or equal to 5. In the embodiment, the aspect ratio of the light-transmitting pillar 310 is larger than or equal to 5, the lights L passing through the light-transmitting pillar 310 all have divergent angles of smaller than 15 degrees. When the divergent angles of lights are closer to 0 degree, the lights can be considered approximately as parallel lights or collimated lights, such that a better FWHM (Full width at half maximum) resolution can be obtained.

Figure 2B:
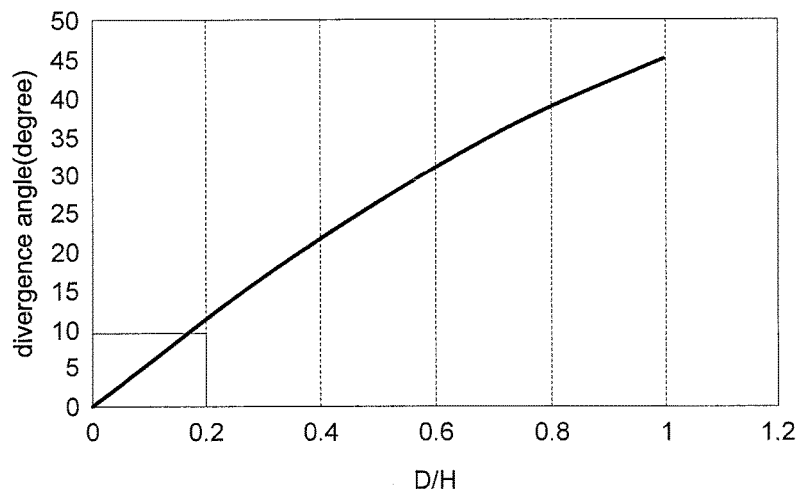
FIG. 2B shows a simulation of the relationship between the ratio of a width to a height of a light-transmitting pillar and the divergent angle according to an embodiment.

FIG. 2B shows a simulation of the relationship between the ratio (D/H) of a width D to a height H of a light-transmitting pillar and the divergent angle according to an embodiment. As shown in FIG. 2B, when the ratio (D/H) of the width D to the height H is less than 0.2, that is, the aspect ratio of the light-transmitting pillar 310 is larger than 5, the divergent angles of the lights L are theoretically smaller than 15 degrees. Further, when the ratio (D/H) of the width D to the height H is less than 0.1, the divergent angles of the lights L can be theoretically smaller than 5 degrees, which behave more like parallel lights.

As shown in FIG. 2A, in the embodiment, the width D of the light-transmitting pillar 310 ranges, for example, from 5 µm to 35 µm.

According to the embodiments of the present disclosure, the light-transmitting structure 300 may be manufactured by integrated wafer level optical package technology, such that the assembling costs from using micro-lenses or injection molding lenses may be reduced, and the effects of better or excellent resolution may be achieved.

In some embodiments, as shown in FIG. 2A, the light incident surface 310a of the light-transmitting pillar 310 may be planar.

In some embodiments, the interference splitter 100 and the sensing element 200 may be located on the same side or on opposite sides of the light-transmitting structure 300. In the embodiment as shown in FIG. 1, the interference splitter 100 and the sensing element 200 may be located on the same side of the light-transmitting structure 300.

In the embodiments as shown in FIGS. 1-2A, after the incident lights L are collimated by the light-transmitting structure 300 having the light-transmitting pillar 310 and the light-absorbing layer 330, the collimated lights L enter the interference splitter 100 and then reach the sensing element 200.

As shown in FIG. 1, in the embodiment, the interference splitter 100 includes an upper reflective surface 110 and a lower reflective surface 130, and the upper reflective surface 110 and the lower reflective surface 130 are separated by an optical distance G. In the embodiment, the interference splitter 100 may be a Fabry-Perot filter, and the upper reflective surface 110 and the lower reflective surface 130 may include distributed Bragg reflector (DBR) structures as well.

In some embodiments, the interference splitter 100 may be a fix-type interference splitter or a tunable-type interference splitter. In a fix-type interference splitter, the optical distance G separating the upper reflective surface 110 and the lower reflective surface 130 is fixed. In a tunable-type interference splitter, the optical distance G separating the upper reflective surface 110 and the lower reflective surface 130 is adjustable, such that the wavelength range of the light transmitting through the interference splitter 100 can be adjusted. Please refer to the disclosure of Taiwan application Serial No. 104138060 for embodiments of tunable-type interference splitters, but the present disclosure is not limited thereto.

In an embodiment, a substrate 400 may include one sensing element 200 or a plurality of the sensing elements 200 of photodiodes. In an embodiment, the substrate 400 may be a sensing matrix component of a CMOS image sensor or a CCD image sensor including a plurality of the sensing elements 200.

In an embodiment, the plurality of sensing elements 200 may be allocated corresponding to one light-transmitting pillar 310.

In the embodiment, as shown in FIG. 1, the light-transmitting structure 300 may include a plurality of the light-transmitting pillars 310, and the light-absorbing layer 330 surrounds the light-transmitting pillars 310.

In the embodiment, as shown in FIG. 1, the optical package 10 may include a sensing matrix component having a plurality of the sensing elements 200 therein. Accordingly, the structure of the embodiment as shown in FIG. 1 may include the substrate 400 disposed with the sensing elements 200, but the present disclosure is not limited thereto. In the present embodiment, the substrate 400 may be a semiconductor substrate, such as a silicon substrate.

In the embodiment, as shown in FIG. 1, in the optical package 10, one interference splitter 100 may be allocated corresponding to multiple sensing elements 200 and multiple light-transmitting pillars 310, but the present disclosure is not limited thereto.

In the embodiment, as shown in FIG. 1, the optical package 10 may include a substrate 500, and the interference splitter 100 may be disposed on the substrate 500. In the embodiment, as shown in FIG. 1, the light-transmitting structure 300 may be also disposed on the substrate 500, and the light-transmitting structure 300 and the interference splitter 100 may be disposed on the opposite surfaces of the substrate 500. In the embodiment, an optical property of the substrate 500 may be similar to that of the light-transmitting pillar 310 of the light-transmitting structure 300. For example, when the incident light is visible light, the substrate 500 may be a glass substrate that the visible light can transmit through. In the embodiment, the lower reflective surface 130 of the interference splitter 100, for example, directly contacts the substrate 500.

In the embodiment, as shown in FIG. 1, the optical package 10 may include at least one bonding pad 600, and the substrate 400 and the substrate 500 can be assembled via the bonding pad 600. In the embodiment, the boding pad 600 may include metal material, organic material, or the mixture thereof. For example, in some embodiments, the material of the bonding pad 600 may include Au, Al, Cu, Ge, or any combination thereof. In some other embodiments, the material of the bonding pad 600 may include a resin material. In some embodiments, the bonding pad 600 may include various materials suitable for heterogeneous bonding.

According to the embodiments of the present disclosure, the wavelength range of the incident light may be variable according to actual needs. Below are multiple embodiments which may be applied. The embodiments are for examples and for explaining the disclosure only and are not to be construed as limitations.

In an embodiment, the incident light is a visible light; that is, the light having the predetermined wavelength range and transmitting through the interference splitter 100 is within a visible light range, and the wavelength range of the light is such as 400-700 nm. The light-transmitting pillar 310 may include silicon, silica, glass, epoxy resin, PMMA, air, negative-type photoresist material, or any combination thereof, and the light-absorbing layer 330 may include polymer, black dye, carbon black, carbon nano-spheres, carbon nanotubes, or any combination thereof.

In an embodiment, the incident light is a UV light; that is, the light having the predetermined wavelength range and transmitting through the interference splitter 100 is within an UV light range, and the wavelength range of the light is such as 100-400 nm. The light-transmitting pillar 310 may include fused silica, air, or a combination thereof, and the light-absorbing layer 330 may include polymer and $TiO_2$ particles.

In an embodiment, the incident light is a near IR light; that is, the light having the predetermined wavelength range and transmitting through the interference splitter 100 is within a near IR light range, and the wavelength range of the light is such as 700-2200 nm. The light-transmitting pillar 310 may include epoxy resin, air, or a combination thereof, and the light-absorbing layer 330 may include polymer, carbon black, cyanine dye, phthalocyanine dye, squarylium dye, diimonium compound, or any combination thereof.

According to some embodiments of the present disclosure, the optical package may be used for fingerprint recognition. According to some other embodiments of the present disclosure, the optical package may also be used for physiological information detection, such as IR images of blood information. IR light can penetrate through skin and reach blood vessels, and thus the IR images of the blood vessels can be obtained.

Figure 2C:
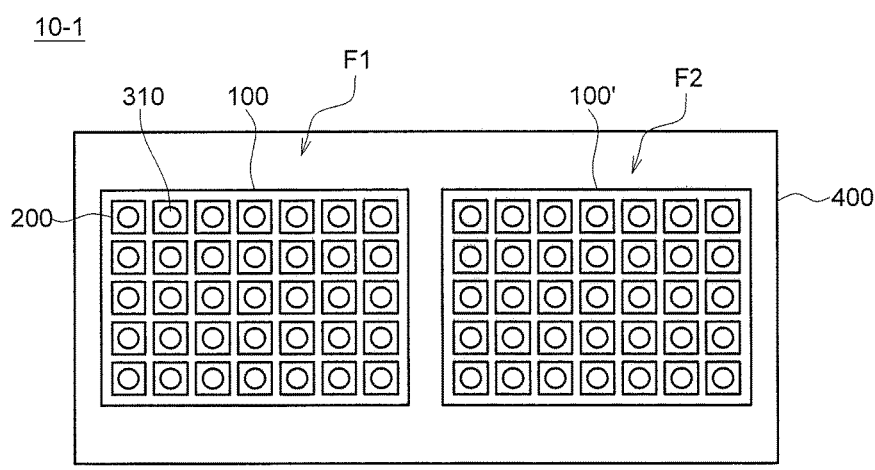
FIG. 2C shows a top view of an optical package according to an embodiment.

FIG. 2C shows a top view of an optical package according to an embodiment. The elements in the present embodiment sharing the same or similar labels with those in the previous embodiments are the same or similar elements, and the description of which is omitted.

According to the embodiments, as shown in FIG. 2C, when a light emits, with the light-transmitting pillars 310 surrounded by the light-absorbing layer 330 and multiple interference splitters 100 and 100' allowing lights with different predetermined wavelength ranges to transmit through, in addition to the sensing elements 200 for detecting the different predetermined wavelength ranges, thus one optical package 10-1 can be provided with multiple functional areas for detecting different wavelength ranges, for example, the functional areas F1 and F2, but the present disclosure is not limited thereto.

Figure 3A:
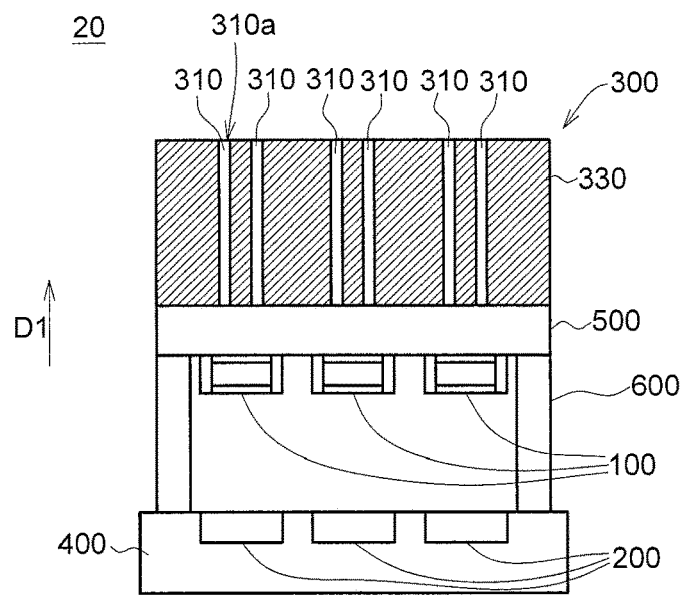
FIG. 3A shows a schematic drawing of an optical package according to another embodiment.

FIG. 3A shows a schematic drawing of an optical package 20 according to another embodiment. The elements in the present embodiment sharing the same or similar labels with those in the previous embodiments are the same or similar elements, and the description of which is omitted.

In some embodiments, one interference splitter 100 may be allocated corresponding to a plurality of light-transmitting pillars 310 and/or a plurality of sensing elements 200. As shown in FIG. 3A, in the present embodiment, one interference splitter 100 may be allocated corresponding to a plurality of light-transmitting pillars 310 for increasing the spatial resolution and the spectral resolution.

In some embodiments, a plurality of light-transmitting pillars 310 may be allocated corresponding to one sensing element 200 or a plurality of sensing elements 200. As shown in FIG. 3A, in the present embodiment, one sensing element 200 is allocated corresponding to a plurality of light-transmitting pillars 310.

In some embodiments, when one sensing element 200 is allocated corresponding to a plurality of light-transmitting pillars 310, this one sensing element 200 may be allocated corresponding to one interference splitter 100 or a plurality of interference splitters 100. As shown in FIG. 3A, in the present embodiment, one sensing element 200 is allocated corresponding to a plurality of light-transmitting pillars 310 and one interference splitter 100.

Figure 3B:
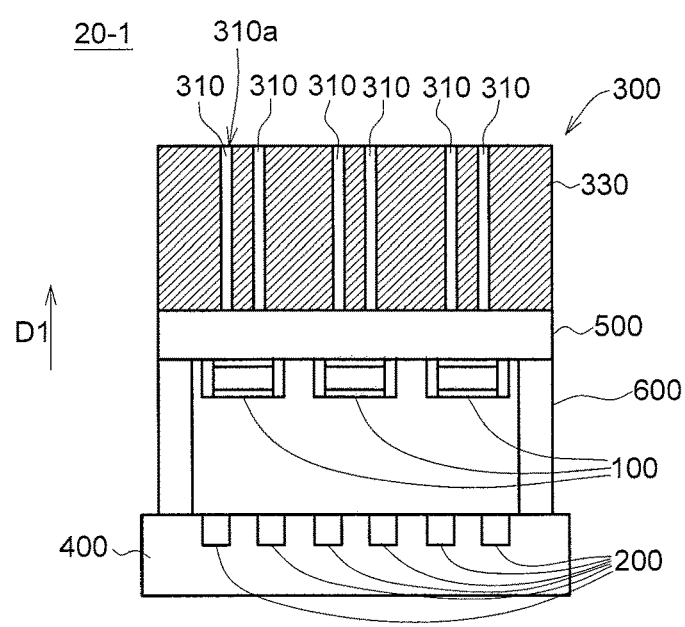
FIG. 3B shows a schematic drawing of an optical package according to a further embodiment.

FIG. 3B shows a schematic drawing of an optical package according to a further embodiment. The elements in the present embodiment sharing the same or similar labels with those in the previous embodiments are the same or similar elements, and the description of which is omitted.

As shown in FIG. 3B, in the embodiment, one interference splitter 100 may be allocated corresponding to a plurality of light-transmitting pillars 310 and a plurality of sensing elements 200.

Figure 3C:
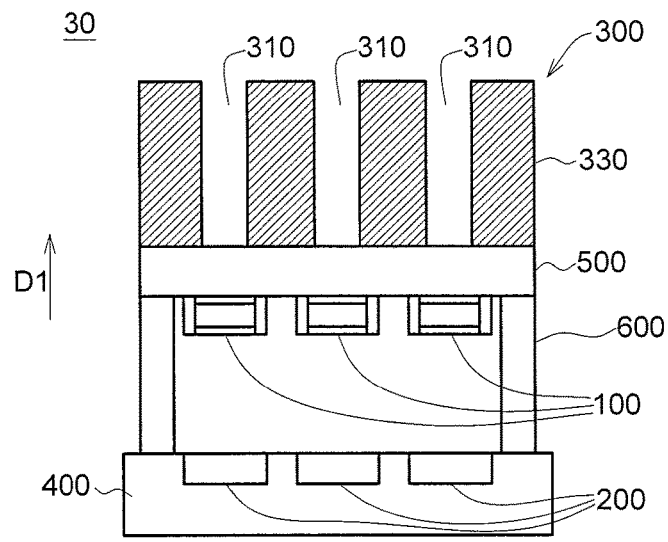
FIG. 3C shows a schematic drawing of an optical package according to a still further embodiment.

FIG. 3C shows a schematic drawing of an optical package according to a still further embodiment. The elements in the present embodiment sharing the same or similar labels with those in the previous embodiments are the same or similar elements, and the description of which is omitted.

In the present embodiment, the incident light is a visible light, and the light-transmitting pillar 310 may be air, but the present disclosure is not limited thereto.

Figure 4:
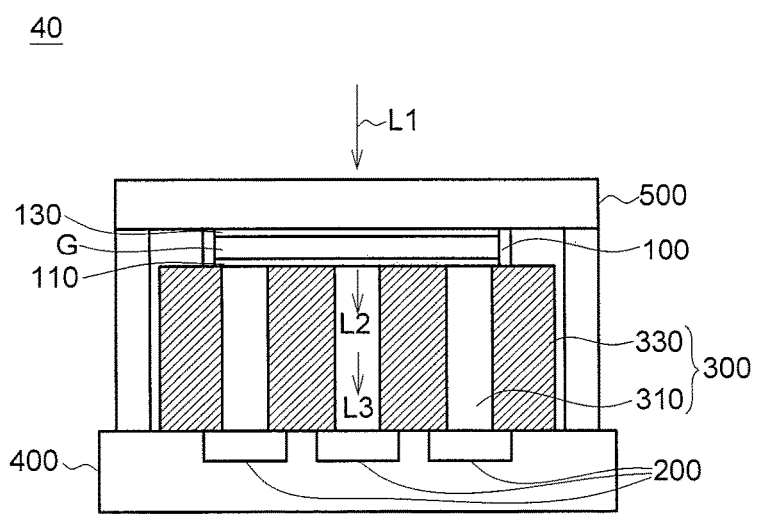
FIG. 4 shows a schematic drawing of an optical package according to an additional embodiment.

FIG. 4 shows a schematic drawing of an optical package according to an additional embodiment. The elements in the present embodiment sharing the same or similar labels with those in the previous embodiments are the same or similar elements, and the description of which is omitted.

In some embodiments, the interference splitter 100 and the sensing element 200 may be located on the same side or opposite sides of the light-transmitting structure 300. As shown in FIG. 4, the interference splitter 100 and the sensing element 200 are located on opposite sides of the light-transmitting structure 300.

In the embodiment as shown in FIG. 4, after the incident lights L pass through the substrate 500 and the interference splitter 100, the lights L2 having a predetermined wavelength range are collimated by the light-transmitting structure 300 having the light-transmitting pillar 310 and the light-absorbing layer 330, and then the almost parallel lights L3 having the aforementioned predetermined wavelength range reach the sensing element 200.

Figure 5:
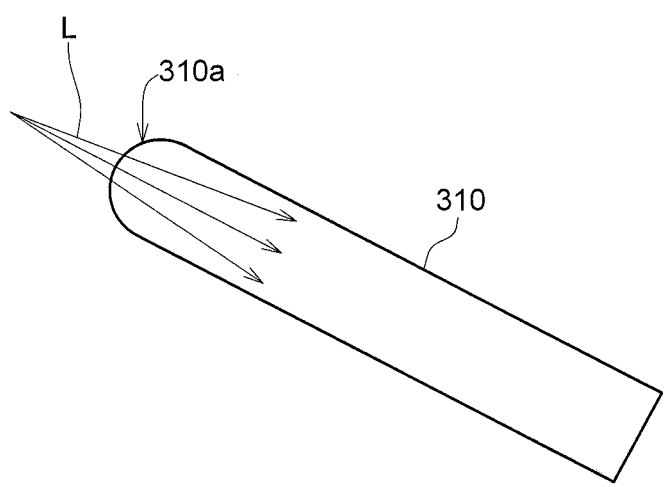
FIG. 5 shows a schematic drawing of a light-transmitting pillar according to an embodiment.

FIG. 5 shows a schematic drawing of a light-transmitting pillar according to an embodiment. The elements in the present embodiment sharing the same or similar labels with those in the previous embodiments are the same or similar elements, and the description of which is omitted.

In some embodiments, the light incident surface 310a of the light-transmitting pillar 310 may be not limited to be planar. Please refer to FIG. 5, the light incident surface 310a of the light-transmitting pillar 310 is non-planar. For example, as shown in FIG. 5, the light incident surface 310a may be a convex surface. FIG. 6A to FIG. 6D show simulations of interference splitting results according to embodiments and comparative embodiments of the present disclosure. The curve A0, the curve A0, the curve A1, the curve A2, the curve A3, the curve A4, the curve A5, the curve A6, the curve A7, the curve A8, the curve A9, the curve A10, the curve A13, the curve A15, the curve A18 and the curve A20 respectively represent the FWHM resolutions when the divergent angles of the incident light emitting to the interference splitter 100 are 0 degree, 1 degree, 2 degrees, 3 degrees, 4 degrees, 5 degrees, 6 degrees, 7 degrees, 8 degrees, 9 degrees, 10 degrees, 13 degrees, 15 degrees, 18 degrees and 20 degrees.

Figure 6A:
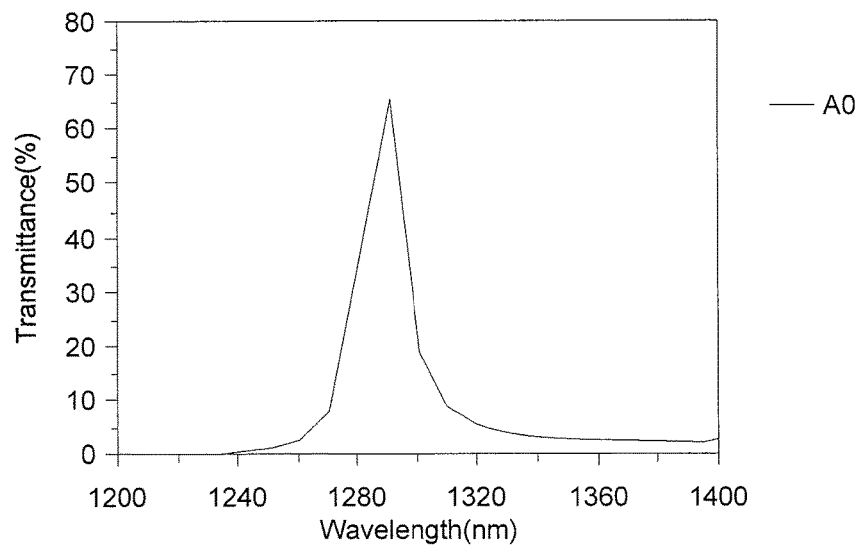
FIG. 6A to FIG. 6D show simulation results according to embodiments and comparative embodiments.

As shown in FIG. 6A, when the divergent angle of the incident lights emitting to the interference splitter 100 is 0 degree, the lights can be represented as total parallel lights. After the lights pass through the interference splitter, the lights having a predetermined wavelength range are emitted with a predetermined center wavelength of 1295 nm and a FWHM of about 17 nm, which are provided with the best spatial resolution and the best spectral resolution.

Figure 6B:
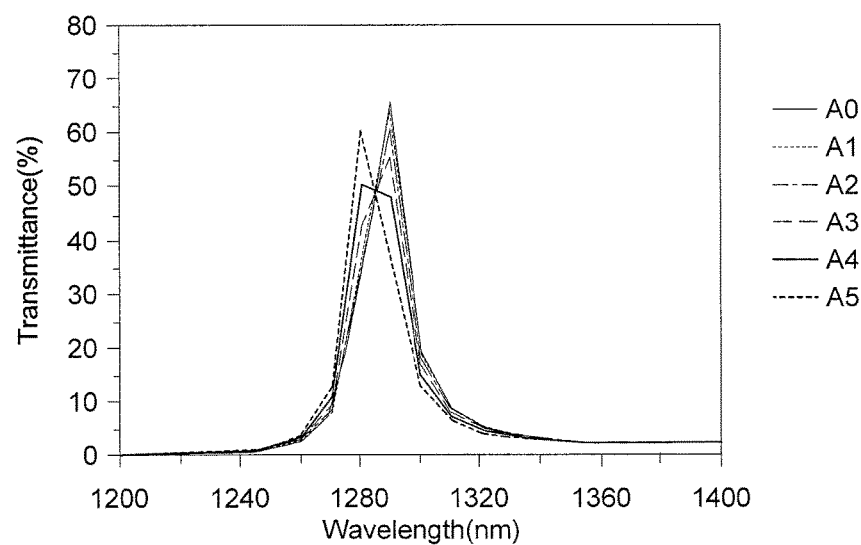

As shown in FIG. 6B, when the divergent angle of the incident lights emitting to the interference splitter 100 is within 0-5 degrees, after the lights pass through the interference splitter, the lights having a predetermined wavelength range are emitted with a FWHM of about 20 nm, which are provided with better spatial resolution and better spectral resolution.

Figure 6C:
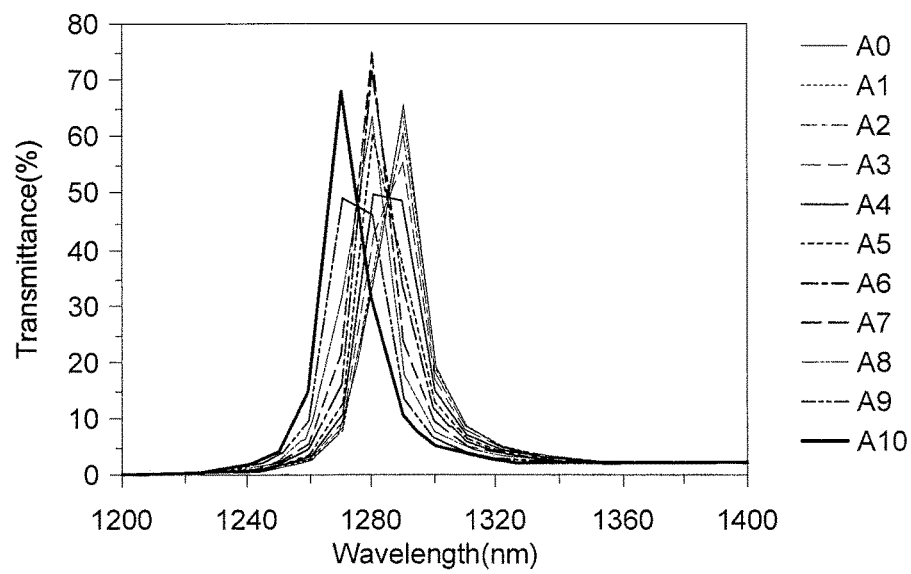

As shown in FIG. 6C, when the divergent angle of the incident lights of the interference splitter 100 reaches 10 degrees, after the lights pass through the interference splitter, the lights having a predetermined wavelength range are emitted with a FWHM of about 32 nm, which are provided with acceptable spatial resolution and acceptable spectral resolution.

Figure 6D:
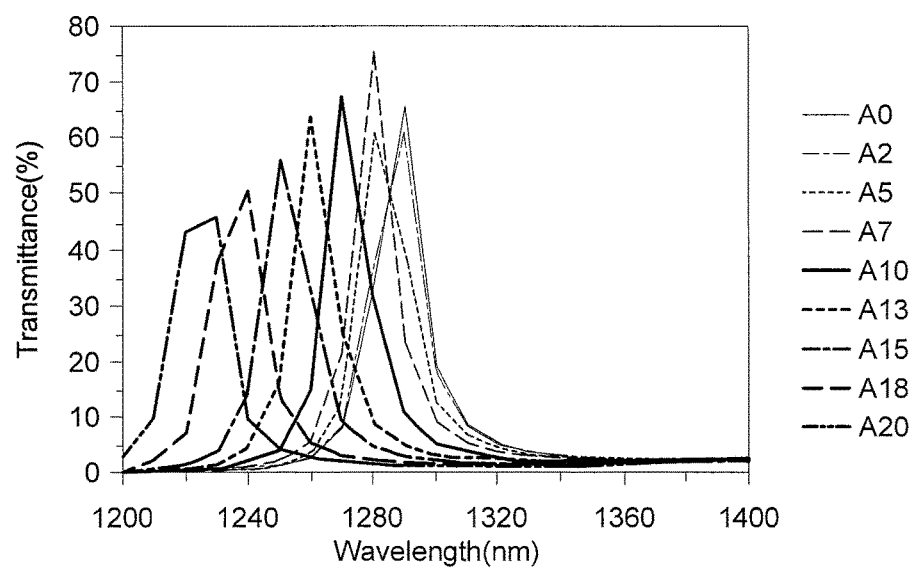

As shown in FIG. 6D, when the divergent angle of the incident lights of the interference splitter 100 exceed 10 degrees, e.g. 15 degrees, after the lights pass through the interference splitter, the lights having a predetermined wavelength range are emitted with a FWHM of about 50 nm, and the predetermined center wavelength is shifted to 1250 nm.

FIG. 7A to FIG. 7F show a manufacturing method of an optical package according to an embodiment. The elements in the present embodiment sharing the same or similar labels with those in the previous embodiments are the same or similar elements, and the description of which is omitted.

Figure 7A:
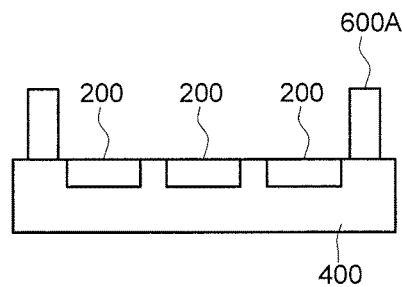
FIG. 7A to FIG. 7F show a manufacturing method of an optical package according to an embodiment.

Please refer to FIG. 7A, bonding pads 600A are provided on the substrate 400 having a plurality of sensing elements 200.

Figure 7B:
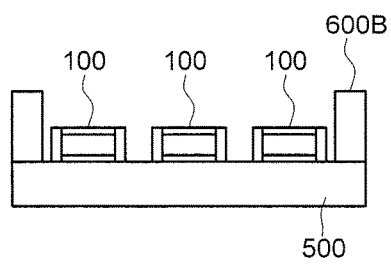

Please refer to FIG. 7B, interference splitters 100 are provided on the substrate 500, and bonding pads 600B are provided on the substrate 500.

Figure 7C:
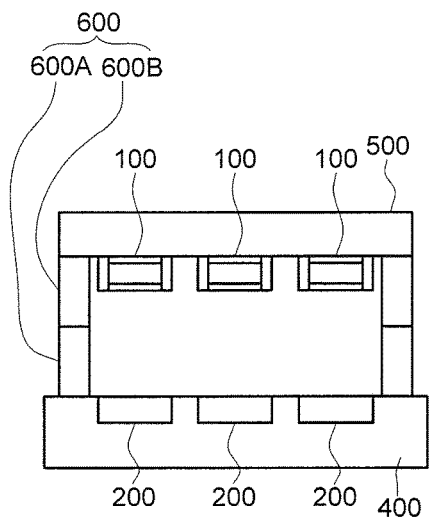

Please refer to FIG. 7C, the bonding pads 600A and the bonding pads 600B are bonded for assembling the substrate 400 and the substrate 500. The bonded bonding pads 600A and 600B form the bonding pads 600.

Figure 7D:
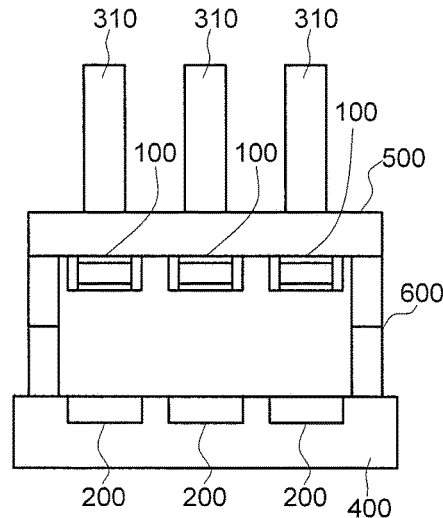

Please refer to FIG. 7D, light-transmitting pillars 310 are formed on the substrate 500. In the embodiment, for example, the light-transmitting material is formed on the substrate 500, and then a photolithography process is performed for producing the light-transmitting pillars 310.

Figure 7E:
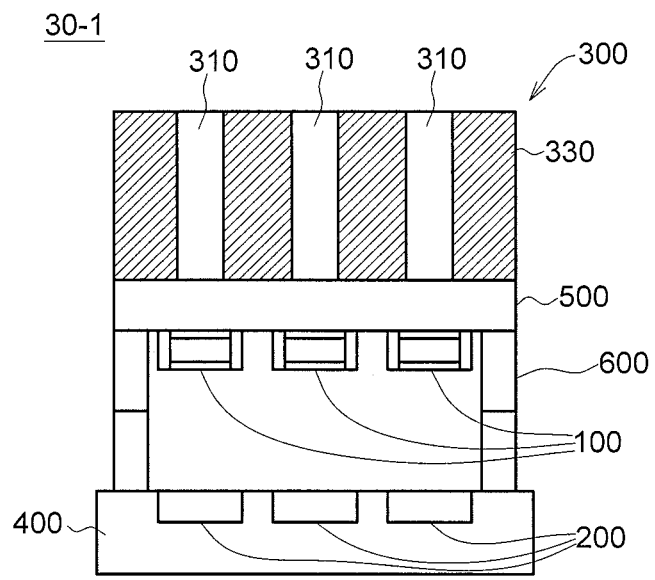

Please refer to FIG. 7E, the light-absorbing layer 330 is formed for surrounding the light-transmitting pillars 310. In the embodiment, for example, the material of the light-absorbing layer 330 is filled into a molding for filling the surrounding of the light-transmitting pillars 310. Next, if the material of the light-absorbing layer 330 covers the light-transmitting pillars 310, the surface of the material of the light-absorbing layer 330 may be optionally polished for exposing the surfaces (e.g. light incident surfaces 310a) of the light-transmitting pillars 310. As such, an optical package 30-1 is formed, wherein one interference splitter 100 is allocated corresponding to one sensing element 200 and one light-transmitting pillar 310.

Figure 7F:
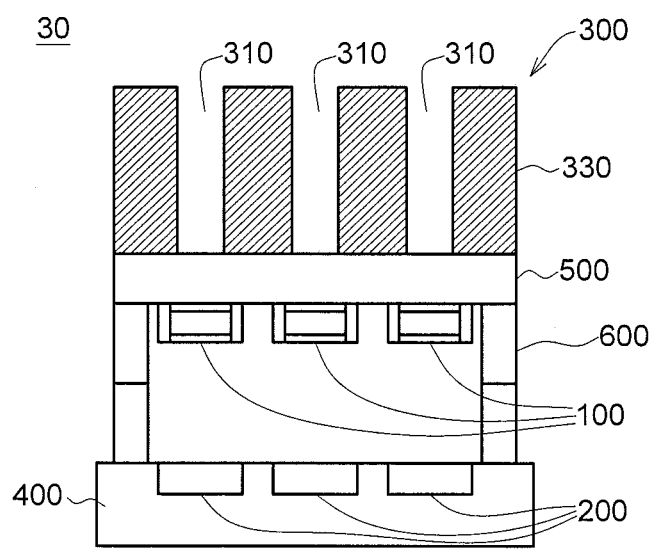

Further, please refer to FIG. 7F, the light-transmitting material of the light-transmitting pillars 310 may be removed, but the present disclosure is not limited thereto. In the embodiment, for example, a chemical reagent may be used to dissolve the light-transmitting material or an etching process may be performed to remove the light-transmitting material. As such, the optical package 30 as shown in FIG. 3B is produced, wherein the material of the light-transmitting pillars 310 is air.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical package, comprising:
an interference splitter allowing a light having a predetermined wavelength range to transmit through;
a sensing element; and
a light-transmitting structure, comprising:
a light-transmitting pillar comprising a non-planar surface; and
a light-absorbing layer surrounding the light-transmitting pillar and absorbing the light having the predetermined wavelength range;
wherein the interference splitter, the light-transmitting pillar, and the sensing element are arranged aligned with each other along an extending direction of the light-transmitting pillar, and the sensing element is configured to receive the light transmitting through the interference splitter and the light-transmitting pillar.

2. The optical package according to claim 1, wherein the light-absorbing layer has a light absorption rate of 70% or higher with respect to the light having the predetermined wavelength range.

3. The optical package according to claim 1, wherein the interference splitter and the sensing element are located on the same side or on opposite sides of the light-transmitting structure.

4. The optical package according to claim 1, wherein the light-transmitting pillar has a width and a height, and a ratio of the height to the width is larger than or equal to 5.

5. The optical package according to claim 4, wherein the width of the light-transmitting pillar ranges from 5 μm to 35 μm.

6. The optical package according to claim 1, wherein the interference splitter comprises an upper reflective surface and a lower reflective surface, and the upper reflective surface and the lower reflective surface are separated by an optical distance.

7. The optical package according to claim 6, wherein the optical distance separating the upper reflective surface and the lower reflective surface is adjustable.

8. The optical package according to claim 1, further comprising a plurality of the sensing elements.

9. The optical package according to claim 8, wherein the plurality of sensing elements are allocated corresponding to the light transmitting pillar.

10. The optical package according to claim 1, wherein the light-transmitting structure comprises:
a plurality of the light-transmitting pillars, wherein the light-absorbing layer surrounds the light-transmitting pillars, and the plurality of light-transmitting pillars are allocated corresponding to the sensing element.

11. The optical package according to claim 1, wherein the light-transmitting structure comprises:
a plurality of the light-transmitting pillars, wherein the light-absorbing layer surrounds the light-transmitting pillars, and the plurality of light-transmitting pillars are allocated corresponding to the interference splitter.

12. The optical package according to claim 1, wherein the light having the predetermined wavelength range is within a visible light range, the light-transmitting pillar comprises silicon, silica, glass, epoxy resin, PMMA, air, or any combination thereof, and the light-absorbing layer comprises polymer, black dye, carbon black, carbon nano-spheres, carbon nano-tubes, or any combination thereof.

13. The optical package according to claim 1, wherein the light having the predetermined wavelength range is within an UV light range, the light-transmitting pillar comprises fused silica, air, or a combination thereof, and the light-absorbing layer comprises polymer and $TiO_2$ particles.

14. The optical package according to claim 1, wherein the light having the predetermined wavelength range is within a near IR light range, the light-transmitting pillar comprises epoxy resin, air, or a combination thereof, and the light-absorbing layer comprises polymer, carbon black, cyanine dye, phthalocyanine dye, squarylium dye, diimonium compound, or any combination thereof.

* * * * *